(12) United States Patent
Mitchell et al.

(10) Patent No.: US 10,533,357 B1
(45) Date of Patent: Jan. 14, 2020

(54) WINDOW ARRANGEMENT OF A MOTOR VEHICLE AND MOTOR VEHICLE COMPRISING SUCH A WINDOW ARRANGEMENT

(71) Applicant: WEBASTO SE, Stockdorf (DE)

(72) Inventors: Ryan Mitchell, Novi, MI (US); David Brooks, Plymouth, MI (US)

(73) Assignee: WEBASTO SE, Stockdorf (DE)

( * ) Notice: Subject to any disclaimer, the term of this patent is extended or adjusted under 35 U.S.C. 154(b) by 0 days.

(21) Appl. No.: 16/036,278

(22) Filed: Jul. 16, 2018

(51) Int. Cl.
 *E05D 7/10* (2006.01)
 *B60J 1/18* (2006.01)

(52) U.S. Cl.
 CPC .......... *E05D 7/1077* (2013.01); *B60J 1/1884* (2013.01); *E05Y 2900/516* (2013.01); *E05Y 2900/532* (2013.01); *Y10T 16/5357* (2015.01)

(58) Field of Classification Search
 CPC ............... Y10T 16/5357; Y10T 16/535; Y10T 16/5359; Y10T 16/536; E05D 7/1044; E05D 7/1055; E05D 7/1061; E05D 7/1077; E05D 7/121; E05D 2007/126; E05D 2007/128; B60J 1/1884; E05Y 2900/516; E05Y 2900/532
 USPC ......... 16/257, 254, 259, 260; 296/146.8, 56, 296/201, 146.15, 146.16
 See application file for complete search history.

(56) References Cited

U.S. PATENT DOCUMENTS

| | | | | |
|---|---|---|---|---|
| 4,116,483 A | * | 9/1978 | Kramer | B60J 1/04 296/190.1 |
| 4,358,151 A | * | 11/1982 | Wood | B60J 1/1884 16/364 |
| 5,707,101 A | * | 1/1998 | Rice | B60J 1/1884 296/146.15 |
| 2006/0016048 A1 | * | 1/2006 | DiMario | B60J 1/14 16/260 |
| 2008/0185867 A1 | * | 8/2008 | Tobergte | B60J 1/1823 296/107.07 |
| 2010/0078957 A1 | * | 4/2010 | Byrnes | E05D 11/0081 296/50 |
| 2010/0207423 A1 | * | 8/2010 | Aldersley | B60J 5/101 296/106 |
| 2014/0097637 A1 | * | 4/2014 | Kargilis | B60J 1/1884 296/146.16 |

* cited by examiner

*Primary Examiner* — William L Miller
(74) *Attorney, Agent, or Firm* — Fitch, Even, Tabin & Flannery, LLP

(57) ABSTRACT

A window arrangement of a motor vehicle is provided having a window pane unit, which can be linked to a vehicle bodywork via a first and second hinge arrangement, the two hinge arrangements defining a common pivot axis of the window pane unit and each comprising two hinge parts, which are connected to each other in an articulated manner, and which can be separated from each other without the use of tools, the two hinge parts of the first hinge arrangement, in a single defined pivoted position being movable with respect to each other and being separable from each other in the radial direction in relation to the pivot axis and the two hinge parts of the second hinge arrangement, in relation to the pivot axis, only being separable from each other in the axial direction when the two hinge parts of the first hinge arrangement have been detached.

10 Claims, 7 Drawing Sheets

WINDOW ARRANGEMENT OF A MOTOR VEHICLE AND MOTOR VEHICLE COMPRISING SUCH A WINDOW ARRANGEMENT

FIELD

A window arrangement of a motor vehicle is described as well as to a motor vehicle having such a window arrangement.

BACKGROUND

It is known from practice, to provide, at the rear side of a motor vehicle, in particular of an all-terrain vehicle, a window arrangement that includes a window pane unit that is pivotably borne/displaceable via two hinge arrangements. Thereby, it is possible to pivot the window pane unit between a closed position for closing a window opening and an open position, in which a vehicle interior can be accessed through the vehicle opening.

Typically the two hinge arrangements each have two hinge parts realized so as to be pivotable with respect to one another, one of the hinge parts being mounted so as to be fixed relative to the vehicle and the other one being mounted so as to be fixed relative to the window pane. In order to detach the window pane unit from the vehicle bodywork, at least one of the hinge parts has to be detached from the vehicle bodywork or from the window pane unit using tools.

SUMMARY

One of the present embodiments provides a window arrangement of a motor vehicle that includes a window pane unit that can, on the one hand, be captively and stably mounted at a vehicle bodywork and, on the other hand, be detached from the vehicle bodywork in a simple and quick manner without the need for any tools.

In accordance with the present embodiments, this object is attained through a window arrangement comprising a window pane unit, which can be linked to a vehicle bodywork via a first hinge arrangement and via a second hinge arrangement, the two hinge arrangements defining a common pivot axis of the window pane unit and each comprising two hinge parts, which are connected to each other in an articulated manner, and which can be separated from each other without the use of tools, the two hinge parts of the first hinge arrangement, in a single defined pivoted position, being movable and being detachable from each other in the radial direction in relation to the pivot axis and the two hinge parts of the second hinge arrangement, in relation to the pivot axis, only being detachable from each other in the axial direction when the two hinge parts of the first hinge arrangement have been detached from each other.

This means that, in the window arrangement according to the present embodiments, the second hinge arrangement can only be taken apart when the first hinge arrangement has already been taken apart. The first hinge arrangement can, however, only be taken apart in one pivoted position of the two hinge parts, that means in a defined pivoted position of the window pane unit. Consequently, the window pane unit can be captively mounted at the vehicle bodywork, but can also be quickly and simply detached from the vehicle bodywork if required, and without using any tools, by pivoting the window pane unit into the defined/predetermined pivoted position.

In one approach of the window arrangement according to the present embodiments, the first hinge arrangement is realized in such a way that one of the hinge parts includes a flattened bearing journal whose width corresponds to a slot, which is realized at a bearing lug of the other hinge part of the first hinge arrangement. When the defined pivoted position has been reached, the bearing journal can be moved through the slot by way of a corresponding offsetting in the radial direction, whereby the two hinge parts of the first hinge arrangement are in turn detached from each other. The length of the bearing journal advantageously corresponds to the inner diameter of the bearing lug, such that a rotation of the bearing journal in the bearing lug with a minimum play in the radial direction is guaranteed while the window pane unit is being pivoted.

In order to have a stop in the transverse direction of the window pane unit or in the longitudinal direction of the pivot axis, the bearing journal is expediently realized at a supporting surface, the bearing lug being adjacent to the supporting surface with a face side.

The hinge part having the bearing journal can be realized so as to be fixed relative to the vehicle. In this case, the hinge part having the bearing lug is realized so as to be fixed relative to the window pane.

A special embodiment of the window arrangement has a second hinge arrangement, in which one of the hinge parts includes a bearing pin, which has a round cross-section and engages with a bearing ring, which is in particular closed and located at the other hinge part.

In order to facilitate detaching of the first hinge arrangement and to reduce the resistance when subsequently detaching the second hinge arrangement, the bearing pin can have a face side that is rounded and in particular forms a spherical surface.

In a preferred embodiment of the present window arrangements, the bearing pin is arranged at a supporting plate, a face side of the bearing ring being adjacent to the supporting plate. In this way, the supporting plate forms a stop in the transverse direction of the window pane unit.

The window pane unit is in particular in one embodiment a rear window of a motor vehicle, which is for example realized as an all-terrain vehicle or as an SUV (Sport Utility Vehicle).

In accordance with a further aspect, a motor vehicle is proposed, having a window arrangement comprising a window pane unit, which is linked to a vehicle bodywork via a first hinge arrangement and via a second hinge arrangement, the two hinge arrangements defining a pivot axis of the window pane unit and each having two hinge parts, which are connected to each other in an articulated manner, and which can be detached from each other without the use of tools, the two hinge parts of the first hinge arrangement, in a first defined pivoted position, being movable with respect to each other in the radial direction in relation to the pivot axis and being separable from each other and the two hinge parts of the second hinge arrangement, in relation to the pivot axis, only being separable from each other in the axial direction when the two hinge parts of the first hinge arrangement have been separated from each other.

Further advantages and advantageous configurations of the subject-matter of the present embodiments can be taken from the description, from the drawing and from the claims.

BRIEF DESCRIPTION OF THE DRAWINGS

In the drawings, an exemplary and non-limiting embodiment of a motor vehicle having a window arrangement is

DETAILED DESCRIPTION

Figure 1:
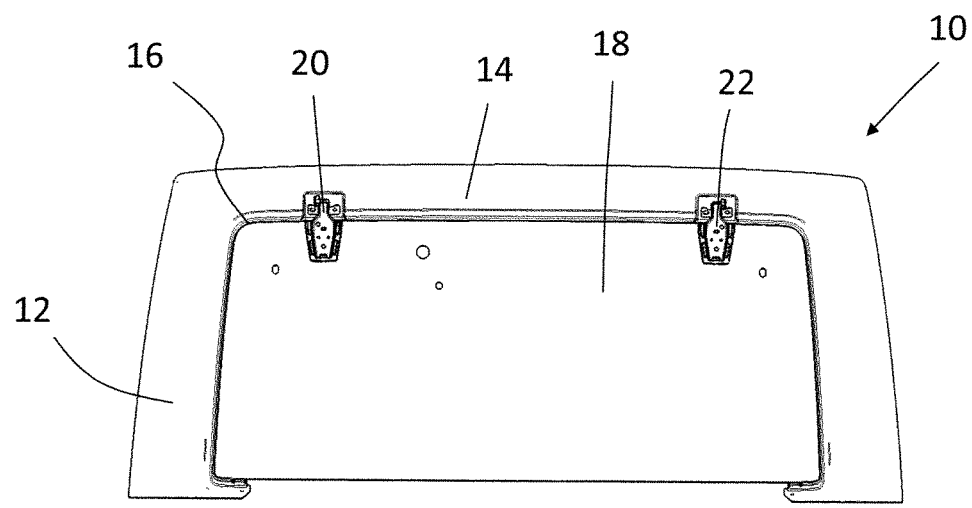
FIG. 1 shows a rear view of a motor vehicle when a backlight is in a closed position.

An exemplary motor vehicle 10 is illustrated in the figures that is realized as an all-terrain vehicle and that has a vehicle bodywork 12 that includes an at least nearly vertical rear side 14. A rear cut-out 16 is realized at the rear side 14, being closed by a window pane unit 18 of a window arrangement in the position illustrated in FIGS. 1 and 3.

Figure 2:
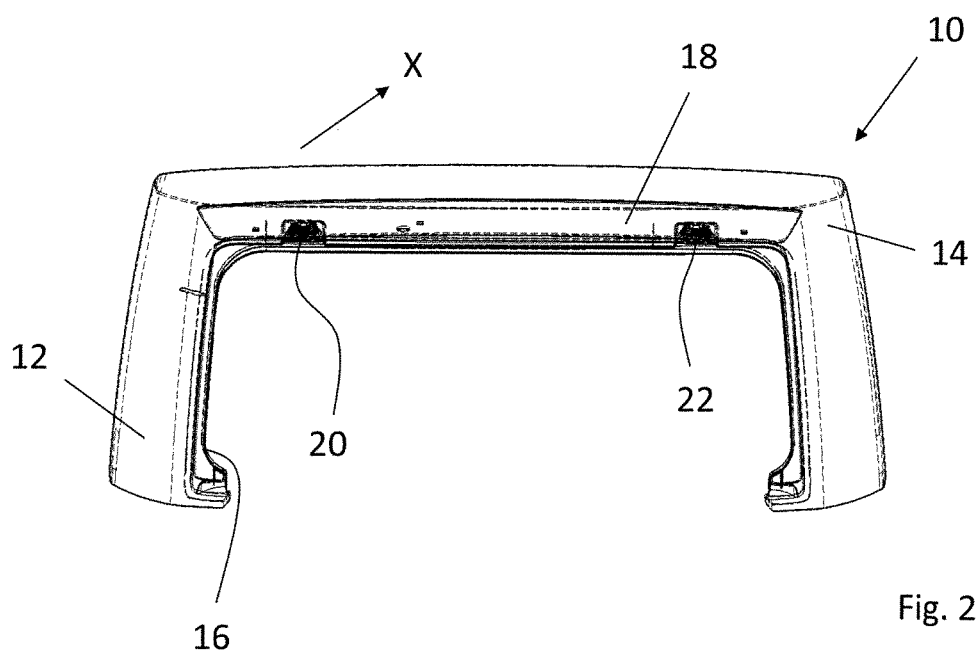
FIG. 2 shows a rear view of the motor vehicle that is similar to FIG. 1, but in an open and removal position of the backlight.
Figure 3:
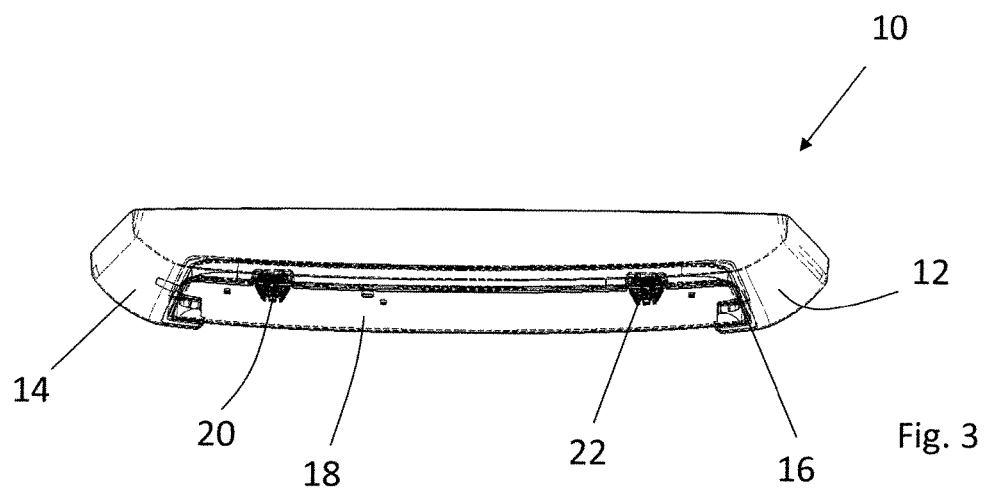
FIG. 3 shows a top view onto a rear region of the vehicle when the backlight is closed.
Figure 4:
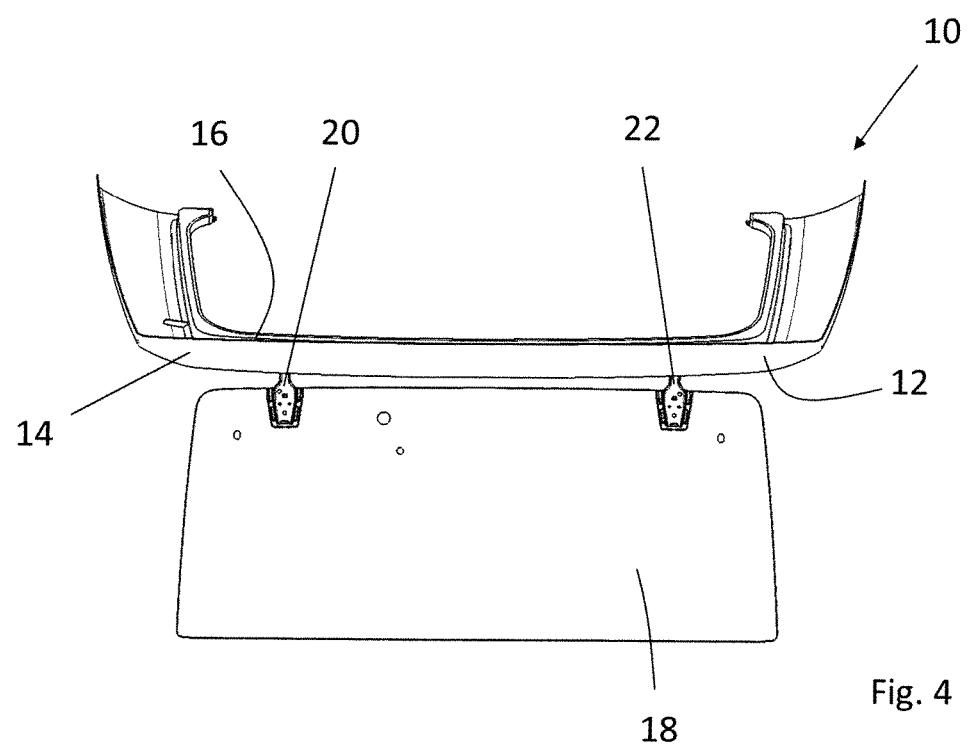
FIG. 4 shows a top view onto the rear region of the vehicle that is similar to FIG. 3, but in the open and removal position of the backlight.
Figure 5:
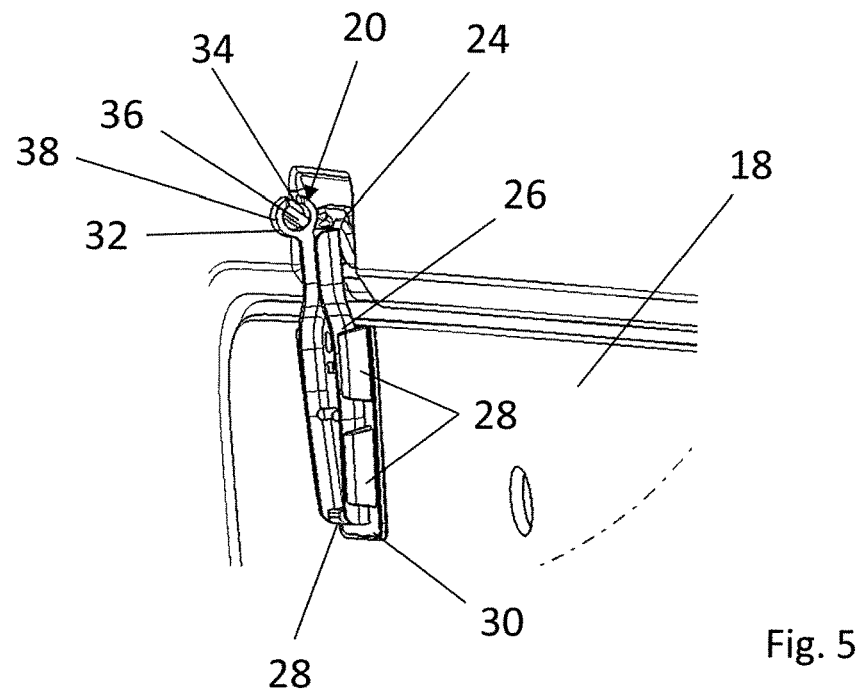
FIG. 5 shows a perspective view of a first hinge arrangement of the backlight.
Figure 6:
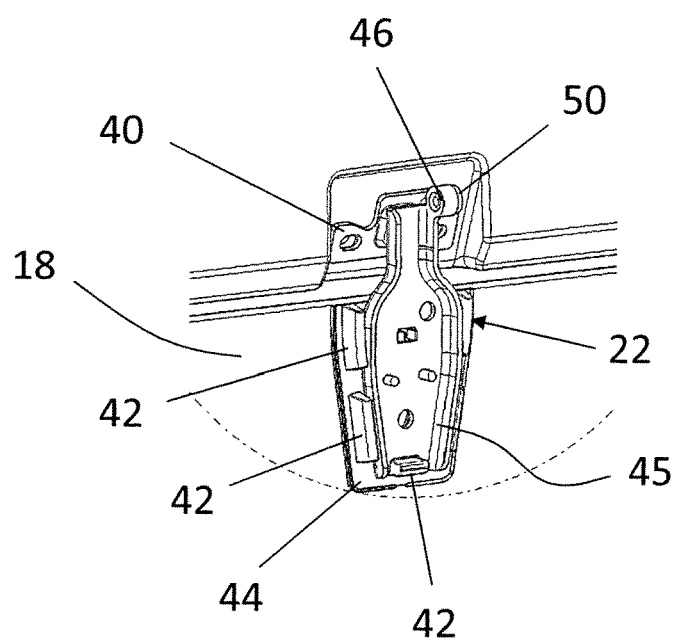
FIG. 6 shows a perspective view of a second hinge arrangement of the backlight.
Figure 7:
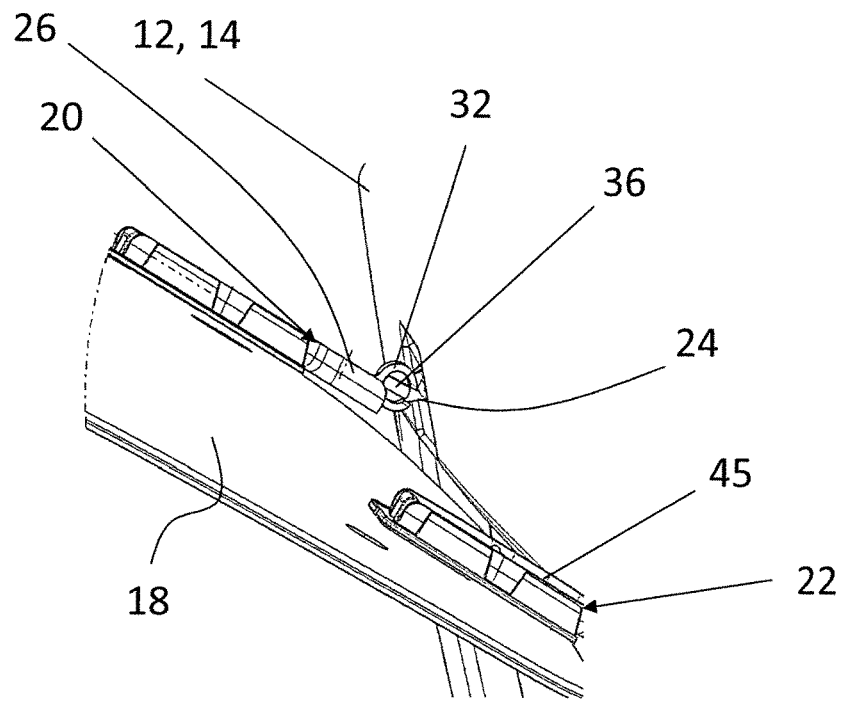
FIG. 7 shows a top perspective view of the first hinge arrangement in an open and removal position of the backlight.
Figure 8:
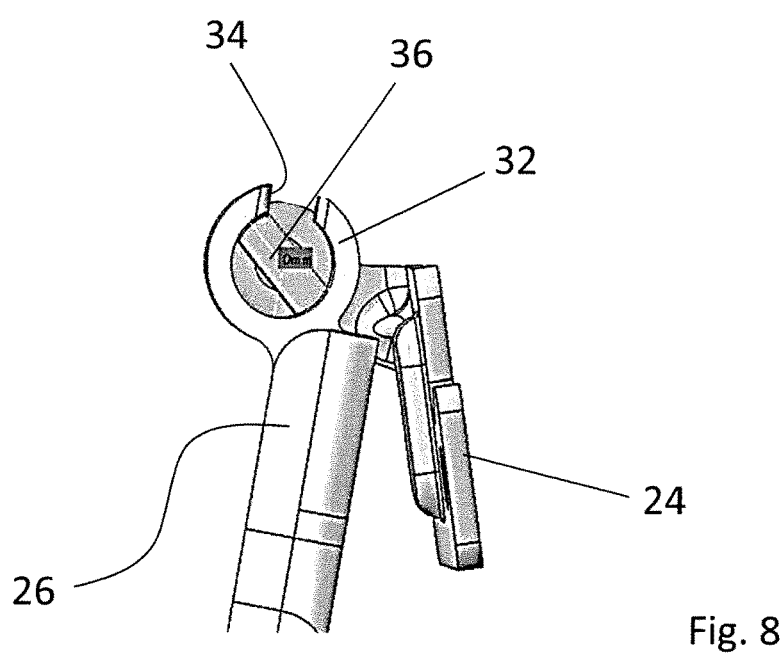
FIG. 8 shows a side view of the first hinge arrangement.
Figure 9:
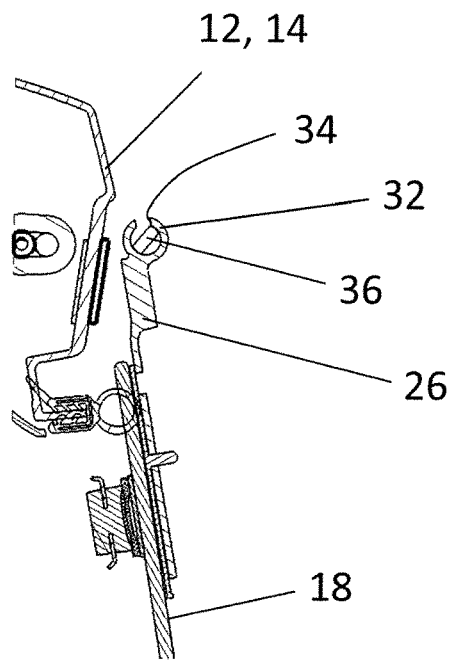
FIG. 9 shows a longitudinal section through the first hinge arrangement in the closed position of the backlight.
Figure 10:
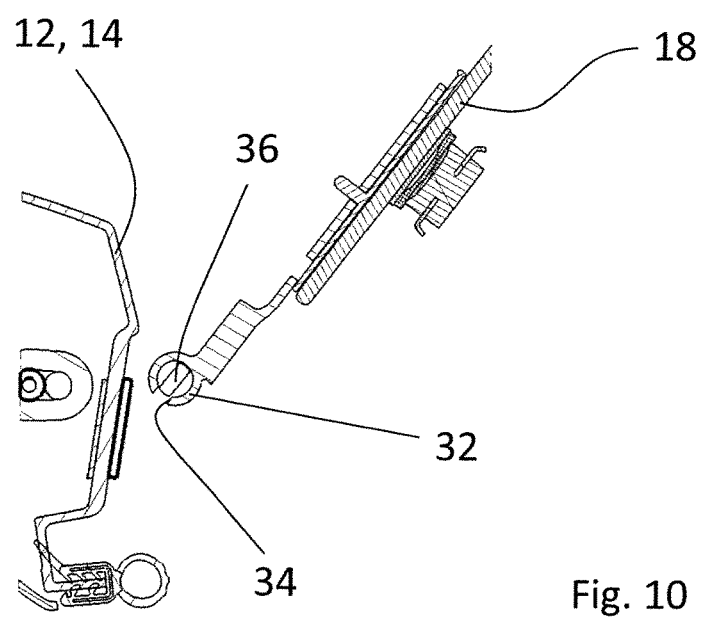
FIG. 10 shows a section through the first hinge arrangement that is similar to FIG. 9, but in the open and removal position of the backlight.

At its upper edge, the window pane unit 18 is provided with two hinge arrangements 20 and 22, by means of which it can be pivoted, about a pivot axis defined by the hinge arrangements 20 and 22, between a closed position for closing the rear cut-out 16, the position being illustrated in FIGS. 1 and 3, and an open and removed position for clearing the rear cut-out 16, the position being illustrated in FIGS. 2 and 4. The hinge arrangements 20 and 22 are arranged at the upper edge of the window pane unit 18 and at the upper edge region of the rear side 14, which limits the rear cut-out 16.

Hinge arrangement 20, which is arranged on the left in relation to a vertical longitudinal centre plane of the vehicle and in relation to the forward direction of travel of the motor vehicle 10, comprises a hinge part 24 mounted at the rear side 14 so as to be fixed relative to the vehicle and a hinge part 26 that is mounted at the window pane unit 18 so as to be fixed relative to the window pane and that is engaged with latching tabs 28 of a base plate 30 fixed relative to the window pane. Hinge part 26, which is fixed relative to the window pane, at its end facing away from the window pane unit 18, forms a bearing lug 32 that is realized like a ring and includes a slot 34 that is arranged at the upper side of the bearing lug 32 in relation to the closed position of the window pane unit 18. A bearing journal 36 engages with the bearing lug 32, the bearing journal 26 being arranged at a supporting plate 38 that is realized at an arm of hinge part 24 and whose plane is oriented so as to be parallel to the longitudinal centre plane of the vehicle. The bearing lug 32, in the mounted position, abuts against the supporting plate 38 with its face side facing the left outer side of the vehicle.

The bearing journal 36 has flat areas on opposite sides and is therefore realized like a rib and has a width that corresponds to the width of the slot 34. The length of the bearing journal 36 corresponds to the inner diameter of the bearing lug 32. The rib 36 extends along an axis that is inclined by approximately 45° as against a line connecting the pivot axis and the centre of the slot 34.

The second hinge arrangement 22 comprises a hinge part 40 arranged at the rear side 14 so as to be fixed relative to the vehicle and a hinge part 45 attached to the window pane unit 18 via latching tabs 42 of a base plate 44.

Hinge part 45 comprises, at its upper end in relation to the closed position of the window pane unit 18, a bearing ring 46 which is realized so as to be closed and with which a bearing pin 48 engages that is realized at a supporting plate 50 that is realized at an arm of hinge part 40, which is fixed relative to the vehicle and is oriented so as to be approximately parallel to the vertical longitudinal centre plane of the vehicle. The bearing ring 46, with its face side facing the right outer side of the vehicle, abuts against the supporting plate 50.

Figure 12:
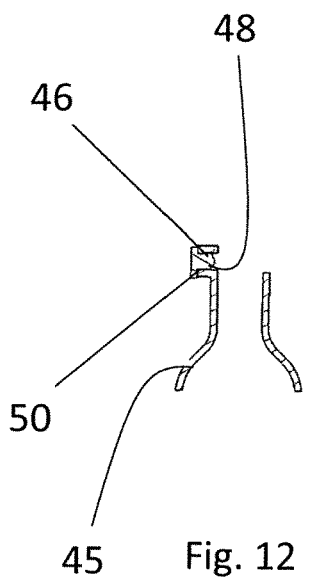
FIG. 12 shows a section through the second hinge arrangement along line XII-XII in FIG. 11.
Figure 11:
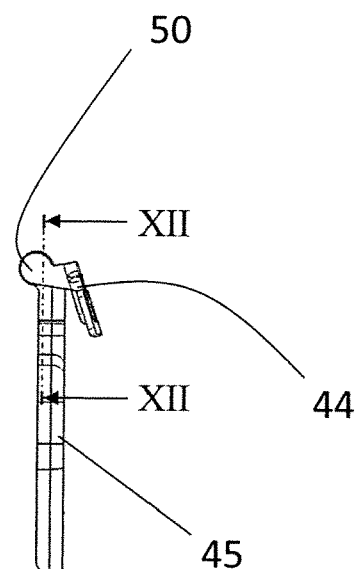
FIG. 11 shows a side view of the second hinge arrangement.
Figure 13:
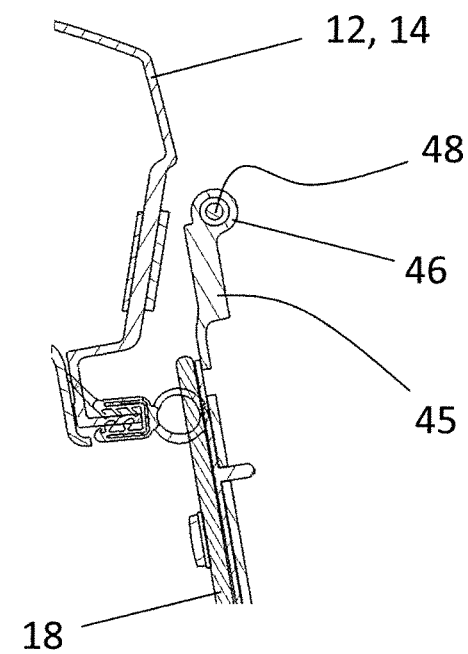
FIG. 13 shows a further longitudinal section through the second hinge arrangement in the closed position of the backlight.
Figure 14:
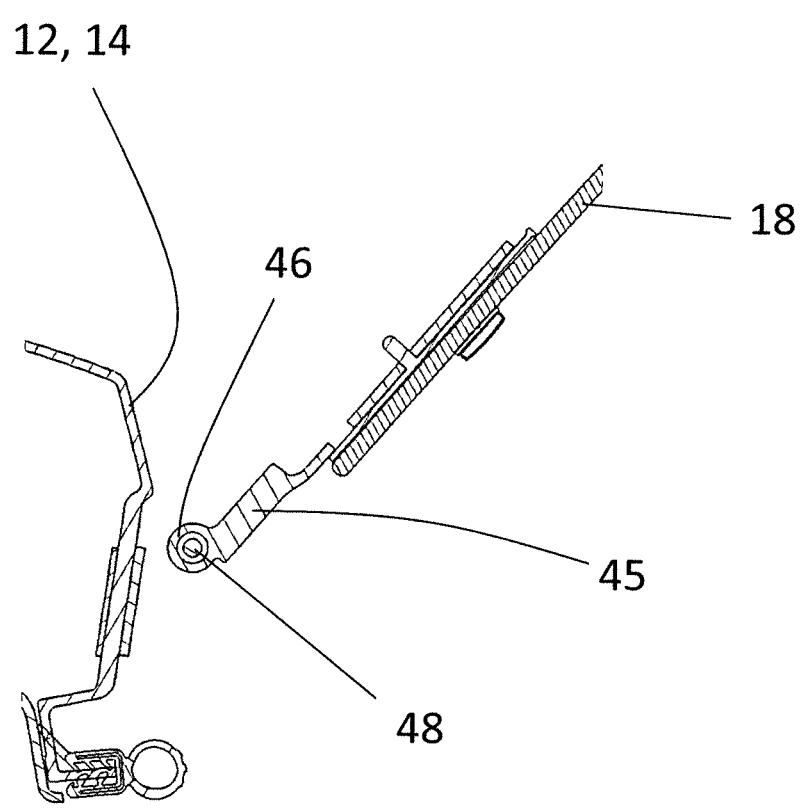
FIG. 14 shows a longitudinal section of the second hinge arrangement that is similar to FIG. 13, but in the open and removal position of the backlight.

The bearing pin 48 has, as it can be taken from FIG. 12, a rounded face side or a face side forming a spherical surface.

In order to remove the window pane unit 18 from the vehicle bodywork 12, it is, starting from the closed position illustrated in FIGS. 1, 3, 5, 6, 8, 9 and 10, pivoted into the open and removed position illustrated in FIGS. 2, 4, 7, 10 and 14, that means by approximately 120° upwards. In this position, the bearing journal 36 of hinge arrangement 20 is aligned with the slot 34 of the bearing lug 32. Consequently, the window pane unit 18 can be pivoted, in accordance with an arrow X illustrated in FIG. 2, about a centre of rotation formed by hinge arrangement 22, such that the bearing journal 36 exits from the bearing lug 32 through the slot 34 and that hinge part 26 is separated from hinge part 24 of hinge arrangement 20. The bearing lug 32 then does not abut against the supporting plate 38 of hinge part 24 anymore, as a result of which hinge arrangement 22 is cleared, such that the bearing ring 46 of the hinge arrangement 22 can be released from the bearing pin 48. The window pane unit 18 has consequently been separated from the vehicle bodywork 14.

The invention claimed is:

1. A window arrangement of a motor vehicle, comprising:
   a window pane unit, which can be linked to a vehicle bodywork via a first hinge arrangement and via a second hinge arrangement,
   the two hinge arrangements defining a common pivot axis of the window pane unit and each comprising two hinge parts, which are connected to each other in an articulated manner, and which can be separated from each other without the use of tools,
   the two hinge parts of the first hinge arrangement, in a single defined pivoted position being movable with respect to each other and being separable from each other in the radial direction in relation to the pivot axis and the two hinge parts of the second hinge arrangement, in relation to the pivot axis, only being separable from each other in the axial direction when the two hinge parts of the first hinge arrangement have been separated from each other.

2. The window arrangement according to claim 1, wherein one of the hinge parts of the first hinge arrangement includes a flattened bearing journal whose width corresponds to a slot at a bearing lug of the other hinge part of the first hinge arrangement.

3. The window arrangement according to claim 2, wherein the bearing journal is provided at a supporting plate, a face side of the bearing lug being adjacent to the supporting plate.

4. The window arrangement according to claim 2, wherein the hinge part having the bearing journal is realized so as to be fixed relative to the vehicle and the hinge part having the bearing lug is fixed relative to the window pane.

5. The window arrangement according to claim 1, wherein one of the hinge parts of the second hinge arrangement includes a bearing pin, which has a round cross-section and engages a closed bearing ring of the other hinge part of the second hinge arrangement.

6. The window arrangement according to claim 5, wherein the bearing pin has a face side that is rounded.

7. The window arrangement according to claim 6, wherein the bearing pin face side forms a spherical surface.

8. The window arrangement according to claim 5, wherein the bearing pin is arranged at a supporting plate, a face side of the bearing ring being adjacent to the supporting plate.

9. The window arrangement according to claim 1, wherein the window pane unit is a rear window.

10. A motor vehicle having a window arrangement comprising:
- a window pane unit, which is connected to a vehicle bodywork via a first hinge arrangement and via a second hinge arrangement,
- the two hinge arrangements defining a pivot axis of the window pane unit and each comprising two hinge parts, which are connected to each other in an articulated manner, and which can be detached from each other without the use of tools,
- the two hinge parts of the first hinge arrangement, in a first defined pivoted position, being movable with respect to each other and being separable from each other in the radial direction in relation to the pivot axis and the two hinge parts of the second hinge arrangement, in relation to the pivot axis, only being separable from each other in the axial direction when the two hinge parts of the first hinge arrangement have been separated from each other.

* * * * *